(12) United States Patent
Haenel et al.

(10) Patent No.: US 8,121,960 B2
(45) Date of Patent: Feb. 21, 2012

(54) PORTAL PERFORMANCE OPTIMIZATION

(75) Inventors: Walter Haenel, Holzgerlingen (DE); Stefan Hepper, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 12/365,201

(22) Filed: Feb. 4, 2009

(65) Prior Publication Data
US 2010/0198759 A1  Aug. 5, 2010

(51) Int. Cl.
*G06F 15/18* (2006.01)
(52) U.S. Cl. .......................................... 706/12
(58) Field of Classification Search ...................... 706/12
See application file for complete search history.

(56) References Cited

U.S. PATENT DOCUMENTS

| | | | |
|---|---|---|---|
| 7,047,888 B2 * | 5/2006 | Richards | 104/28 |
| 7,152,171 B2 * | 12/2006 | Chandley et al. | 713/320 |
| 7,275,167 B2 * | 9/2007 | Chandley et al. | 713/320 |
| 7,499,948 B2 * | 3/2009 | Smith et al. | 1/1 |
| 7,606,154 B1 * | 10/2009 | Lee | 370/232 |
| 7,757,120 B2 * | 7/2010 | Ogle et al. | 714/26 |
| 7,805,382 B2 * | 9/2010 | Rosen et al. | 705/321 |
| 7,877,293 B2 * | 1/2011 | Biebesheimer et al. | 705/26.64 |
| 7,925,594 B2 * | 4/2011 | Jaligama et al. | 705/348 |
| 7,925,977 B2 * | 4/2011 | Figlin | 715/713 |
| 8,019,697 B2 * | 9/2011 | Ozog | 705/412 |

OTHER PUBLICATIONS

Joint Optimization of Word Alignment and Epenthesis Generation for Chinese to Taiwanese Sign Synthesis, Yu-Hsien Chiu; Chung-Hsien Wu; Hung-Yu Su; Chih-Jen Cheng; Pattern Analysis and Machine Intelligence, IEEE Transactions on vol. 29, Issue: 1 Digital Object Identifier: 10.1109/TPAMI.2007.250597 Publication Year: 2007, pp. 28-39.*
Multipath Routing, Congestion Control and Dynamic Load Balancing, Key, P.; Massoulie, L.; Towsley, D.; Acoustics, Speech and Signal Processing, 2007. ICASSP 2007. IEEE International Conference on vol. 4 Digital Object Identifier: 10.1109/ICASSP.2007.367326 Publication Year: 2007, pp. IV-1341-IV-1344.*
Practical introduction to simulation optimization, April, J.; Glover, F.; Kelly, J.P.; Laguna, M.; Simulation Conference, 2003. Proceedings of the 2003 Winter vol. 1 Digital Object Identifier: 10.1109/WSC.2003.1261410 Publication Year: 2003, pp. 71-78 vol. 1.*
Rough Set Based Approach to Base Noun Phrase Identification, Yonghui Guo; Fang Ma; Bingxi Wang; Jian Li; Intelligent Control and Automation, 2006. WCICA 2006. The Sixth World Congress on vol. 1 Digital Object Identifier: 10.1109/WCICA.2006.1713146 Publication Year: 2006, pp. 4103-4107.*

* cited by examiner

*Primary Examiner* — Michael B Holmes
(74) *Attorney, Agent, or Firm* — Cantor Colburn LLP; Ayla Lari

(57) ABSTRACT

A method for portal performance optimization comprises receiving a request for a portal page, the portal page comprising a plurality of portlets; determining a current system load; determining, based on the current system load, whether a performance rule is triggered; and in the event a performance rule is triggered, deactivating at least one of the plurality of portlets. A system for portal performance optimization comprises a portal server configured to receive a request for a portal page, the portal page comprising a plurality of portlets, the portal server comprising a performance management component, the performance management component configured to determine a current system load; and a rules engine, the rules engine configured to determine if a performance rule is triggered by the determined current system load, and, in the event a performance rule is triggered, to apply the triggered performance rule to at least one of the plurality of portlets.

20 Claims, 5 Drawing Sheets

W3  Walter Haenel's On Demand Workplace    IBM

| Home | Work | Career and life | Germany |

W3 Home | Blue Pages | Help Now | Feedback

Edit tab | Add new tab | Show layout tools | Help

What's new 304

News 301

Search 302

Top Stories    Past 7 days >

Blue Pages
Search type
Name ▼
Search for
[        ] GO

Advanced Search

Currently, there are no new items

Business Partners tackle growth markets
These important partners broaden our reach and strengthen relationships

IBMers: hack IBM!
Hackday 5 is your chance to change IBM for good

Market Report 305

Quoted at 4:11 PM EDT on 26 Mar, Refresh

| Symbol | Current | +/- |
|---|---|---|
| IBM | 116.91 | -1.06 |
| MSFT | 28,56 | -.056 |
| JAVA | 16.47 | +0.09 |

Essential Links 303

About w3
About IBM
Collaboration Central
Create your w3 profile now
Customer Reference Materials
Expense Accounts – Worldwide
Find WPLC Software in XL
Globalization Central
IBM On Demand Community
IBM SiteServe
IT Tools and Support
IBM Travel
Learning @ IBM
Our Values at Work
Presentation Central
W3 Directory

Why IBM?
Software Group
Steve Niles explains our software strategy at the IBM investor briefing

Discount Journals subscriptions for employees
International employees can subscribe to IBM journals for $40 each per year

FIG. 3

PORTAL PERFORMANCE OPTIMIZATION

BACKGROUND

This disclosure relates generally to the field of web portal performance.

A web portal, or portal page, may provide a user with an initial point of access to information on a network, presenting information from diverse sources to the user in a unified manner. A portal page may provide services including but not limited to a search engine, email, news, or stock prices, presenting information from different locations in a common context.

The portal page may offer these services through a number of applications, or portlets, that make up the overall portal page. However, a portal page with a large number of component portlets may consume a large amount of system resources and generate significant traffic on the network. This is tolerable if the overall load on the system is low; however, if the load on the system is high, a large number of portlets may overburden the system, while a reduction in portlets on the portal page may reduce the performance burden on the system.

BRIEF SUMMARY

An exemplary embodiment of a method for portal performance optimization comprises receiving a request for a portal page, the portal page comprising a plurality of portlets; determining a current system load; determining, based on the current system load, whether a performance rule is triggered; and in the event a performance rule is triggered, deactivating at least one of the plurality of portlets.

An exemplary embodiment of a system for portal performance optimization comprises a portal server configured to receive a request for a portal page, the portal page comprising a plurality of portlets, the portal server comprising a performance management component, the performance management component configured to determine a current system load; and a rules engine, the rules engine configured to determine if a performance rule is triggered by the determined current system load, and, in the event a performance rule is triggered, to apply the triggered performance rule to at least one of the plurality of portlets.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 3 illustrates an embodiment of a portal page.

DETAILED DESCRIPTION

Embodiments of systems and methods for portal performance optimization are provided, with exemplary embodiments being discussed below in detail.

A measurement of overall system load may be used to determine an initial state of a portal page that is presented to a user. During low system load, all portlets on the page may be presented. During high system load, selected portlets in the initial portal page may be deactivated by, for example, setting a default state of the selected portlets to minimized.

An administrator may define performance rules for the portal page, defining levels of system load at which to deactivate selected portlets. These rules may be contained in the portal page metadata. Portlets that are used infrequently may be minimized at moderate system load, while frequently-used portlets may be minimized at higher system load. Some portlets may also generate higher system traffic than others; portlets that generate higher traffic may be minimized at lower overall system load than portlets that generate lower traffic. The performance rules of the portal page may be modified by an administrator, allowing the administrator to define the behavior of individual portlets. A portal server may also track user behavior, and determine for a user or for a group of users which portlets are used most frequently, and deactivate portlets that are used less frequently at high system load. The performance rules may be defined based on the likelihood that a specific portlet is accessed per user session. The initial portal page may be presented to a user at browser startup; however, in many cases, the user bypasses the initial portal page to reach another portal or web page. Defining performance rules to reduce the system load generated by the initial portal page may greatly reduce the overall system load without inconveniencing the user.

Figure 1:
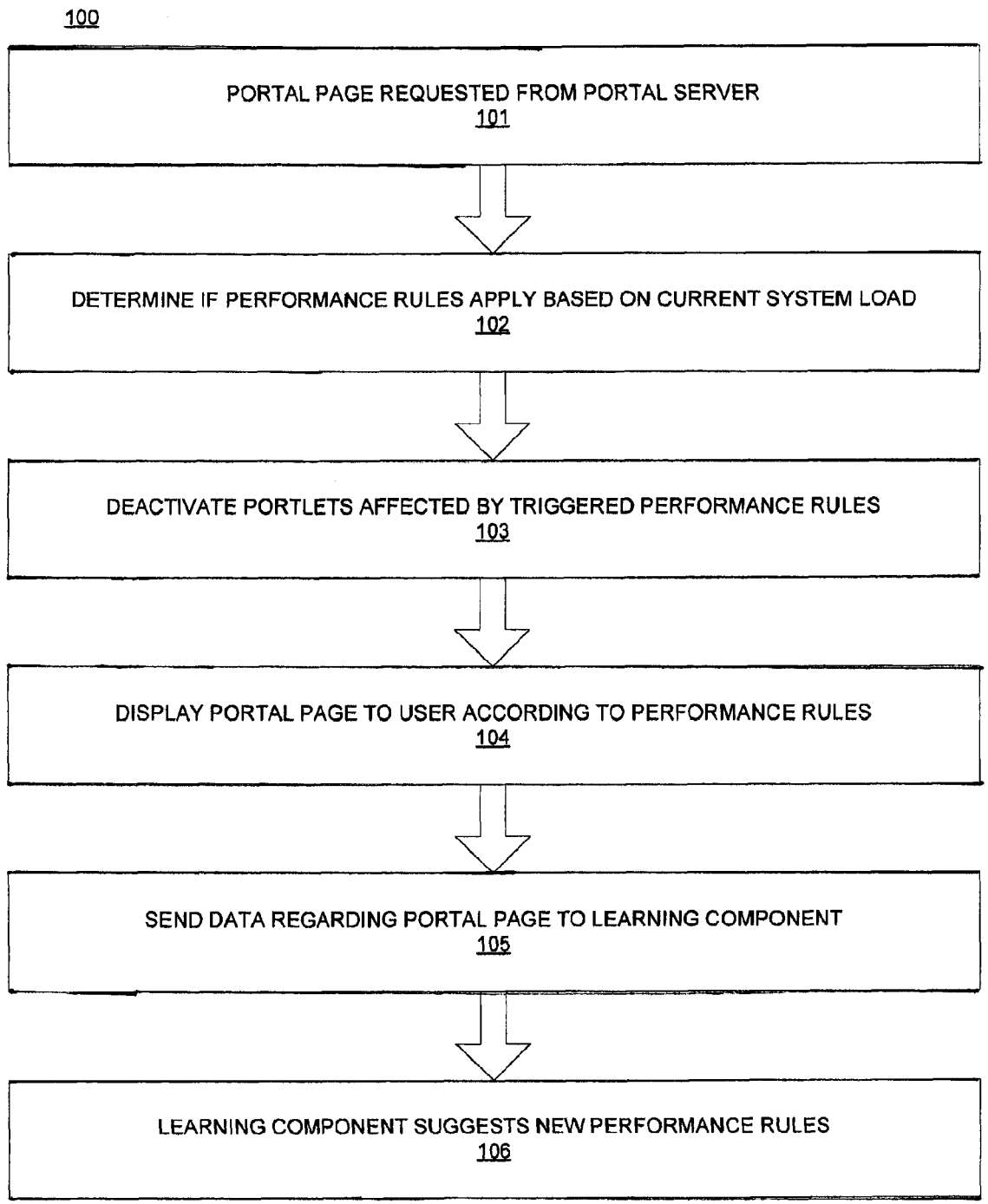
FIG. 1 illustrates an embodiment of a method for portal performance optimization.

FIG. 1 illustrates an embodiment of a method 100 for portal performance optimization. In block 101, a portal page comprising a plurality of portlets is requested from a portal server. In block 102, it is determined whether a performance rule applies based on the current system load. The performance rule may be defined by an administrator. In some embodiments, a user may be given administrator privileges to define a performance rule for their particular instance of the portal page. In block 103, if a performance rule is triggered by the current system load, any portlets affected by the performance rule for the current system load are deactivated; the portlets may be deactivated by the portal without interaction with the portlet, for example, by being minimized. Minimization may include displaying a reduced amount of information by the portlet, reducing use of backend systems. An affected portlet may be replaced by a static HTML fragment that contains core information, or may be tuned to consume less resources by, for example, reducing functionality of the portlet. An affected portlet may be sent a deactivation message in some embodiments.

In block 104, the portal page is displayed to the user, with the component portlets displayed according to the triggered performance rules. In block 105, data regarding an outcome of triggered performance rules, the navigation of the user (i.e., which, if any, portlets are selected by the user), and the system load of various portlets are fed into a learning component. Based on the data, the learning component may provide suggestions for new performance rules to a portal administrator in block 106. For example, if a specific user repeatedly reactivates a deactivated portlet, the learning component may suggest a rule to always present the page to the specific user with the portlet active. A suggested rule may automatically replace an existing rule in some embodiments.

Figure 2:
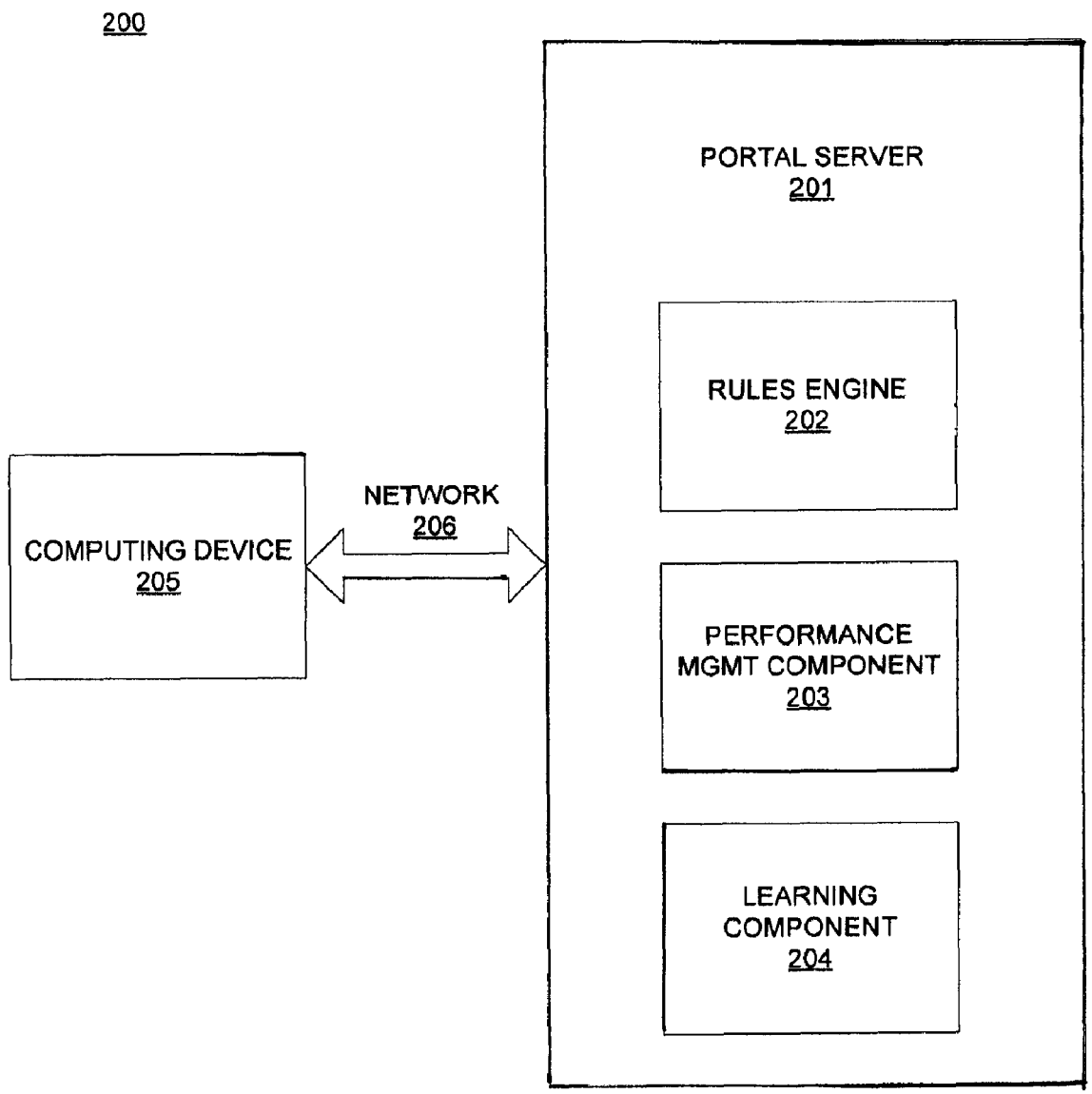
FIG. 2 illustrates an embodiment of a system for portal performance optimization.

FIG. 2 illustrates an embodiment of a system 200 for portal performance optimization. Portal server 201 comprises rules engine 202, performance management component 203, and learning component 204, in addition to hardware and software configured to generate the portal page; this may include various backend systems. Rules engine 202 may contain performance rules set by an administrator. A user communicates with portal server 201 via a computing device 205 connected to network 206. Computing device 205 requests the portal page from portal server 201. Performance management component 203 determines a current system load of system 200, including a load of any backend systems that are used to generate the portal page, and sends the current system load to rules engine 202. Rules engine 202 determines if any performance rules are triggered by the current system load. If a performance rule is triggered, portal server 201 renders the individual portlets that comprise the portal page according to the triggered performance rule, and sends the portal page to computing device 205 via network 206. Learning component 204 receives data regarding an outcome of triggered performance rules, the navigation of the user (i.e., which, if any, portlets are selected by the user), and the system load of various portlets, and may determine new performance rules for rules engine 202 based on the data. An administrator or a user with administrator privileges may also modify performance rules contained in rules engine 202 via computing device 205 and network 206.

FIG. 3 illustrates an embodiment of a portal page 300. The portal page 300 presents news stories in news portlet 301. The information contained in news portlet 301 may change only once a day, so it may be cached. Therefore, the system load generated by news portal 301 may be relatively low. Search portlet 302 may be a frequently-used portlet that is also cacheable, generating a relatively low system load. Essential links portlet 303 may also be frequently used, and may be cached. What's new portlet 304 may search dynamically for content based on user properties. As a result, the what's new portlet 304 may not be cached across multiple users, and dynamic generation may create a relatively high system load. Users may use the what's new portlet 304 relatively infrequently. Market report portlet 305 is also dynamically generated from user settings specifying a list of stock symbols to display and current market data. Thus, the market report portlet may not be cached across multiple users, and may have a relatively high system load due to dynamic generation. The market report portlet 305 may be also be used relatively infrequently.

Given the respective usages and system loads of portlets 301-305, an administrator may set performance rules specifying that what's new portlet 304 and market report portlet 305 may be deactivated during periods of high system load. If what's new portlet 304 generates a higher system load, the performance rules may specify that if the system load starts to get high, what's new portlet 304 may be deactivated at a moderate system load, and market report portlet 305 may be deactivated at a higher level of system load. The performance rules may specify that a system load may be above a certain level for a predetermined period of time before a portlet is deactivated. In this example, the administrator may create 2 rules: rule 1, which is triggered if the CPU utilization goes above 80% for more than a minute, and rule 2, which is triggered if the CPU utilization stays above 80% for more than 10 minutes. The administrator may further connect the selected portlets with the rules, deactivated the what's new portlet 304 if rule 1 is triggered, and deactivated the market report portlet if rule 2 is triggered.

Figure 4:
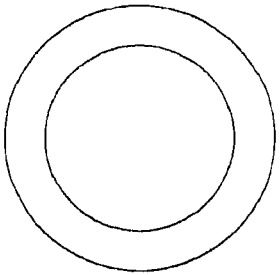
FIG. 4 illustrates an embodiment of a portal page.

If the system load exceeds 80% CPU utilization for more than 10 minutes, rule 1 and rule 2 may be triggered, resulting in the embodiment of a portal page 400 shown in FIG. 4. In portal page 400, what's new portlet 404 and market research portlet 405 are deactivated. The system may use various methods to deactivate the portlets, including but not limited to minimization. The title bars of the deactivated portlets are visible, indicating the availability of the portlet to a user. The user may choose to maximize a deactivated portlet, or to redefine the performance rules for a particular portlet for the individual user. This may results in additional system load being generated by the individual user, however, overall system load generated by all users may be significantly reduced. If a user modifies the performance rules for the user's portal page, the modified performance rules may be active for a user session, or for a longer period of time that may be set by an administrator.

Figure 5:
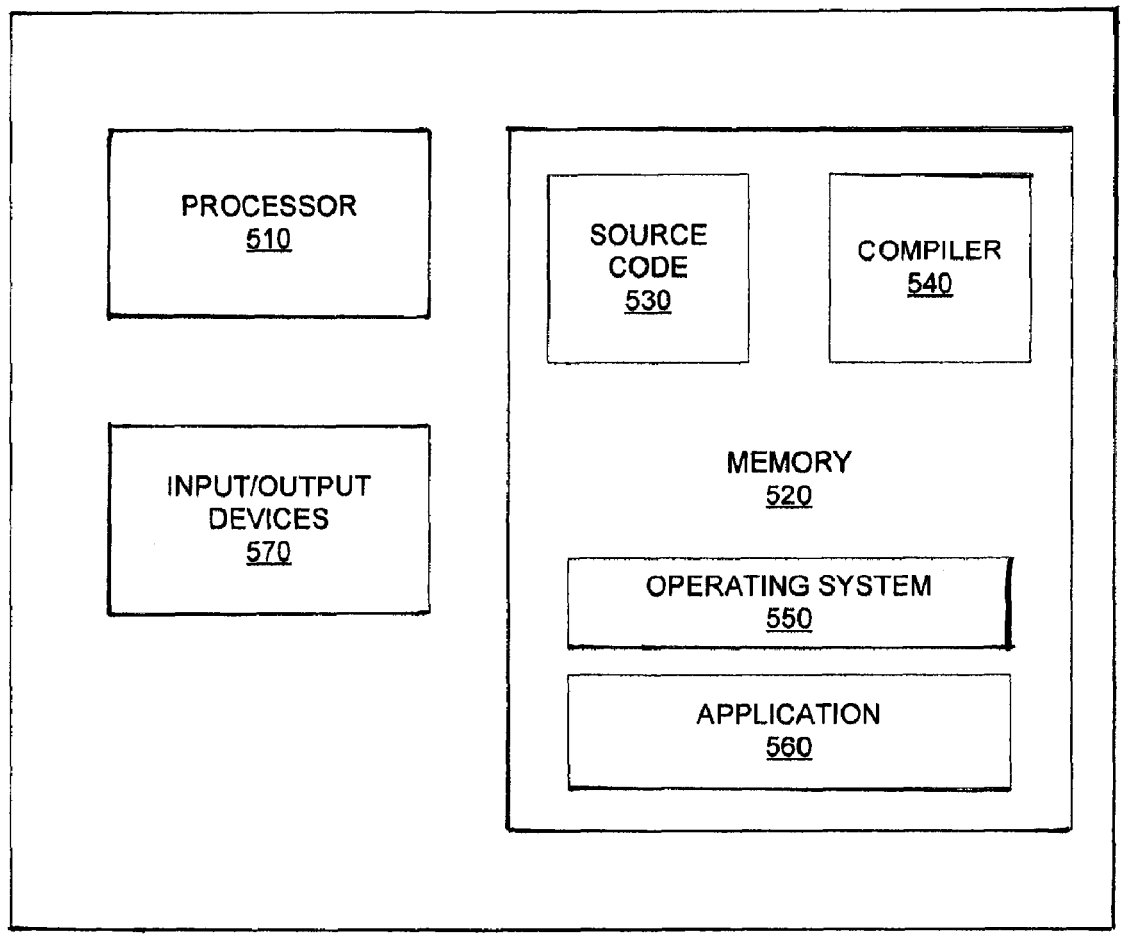
FIG. 5 illustrates an embodiment of a computer that may be used in conjunction with systems and methods for portal performance optimization.

FIG. 5 illustrates an example of a computer 500 having capabilities, which may be utilized by exemplary embodiments of systems and methods for portal performance optimization as embodied in software. Various operations discussed above may utilize the capabilities of the computer 500. One or more of the capabilities of the computer 500 may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include reduction of system load caused by a portal page while minimizing inconvenience to the user.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for portal performance optimization, the method comprising:
   receiving a request for a portal page, the portal page comprising a plurality of portlets;
   determining a current system load;
   determining, based on the current system load, whether a performance rule is triggered; and
   in the event a performance rule is triggered, deactivating at least one of the plurality of portlets.

2. The method of claim 1, further comprising receiving data regarding the portal page.

3. The method of claim 2, further comprising suggesting of a new performance rule based on the received data.

4. The method of claim 3, further comprising automatically replacing the performance rule with the suggested new performance rule.

5. The method of claim 2, wherein the received data comprises a system load generated by one of the plurality of portlets.

6. The method of claim 2, wherein the received data comprises a usage of a portlet by a user.

7. The method of claim 1, wherein the performance rule is set by an administrator.

8. The method of claim 7, wherein the administrator is the user.

9. The method of claim 8, wherein the performance rule set by the user is valid for the duration of a session.

10. The method of claim 1, wherein deactivating at least one of the plurality of portlets comprises sending a deactivation message to the at least one portlet.

11. The method of claim 1, wherein deactivating at least one of the plurality of portlets comprises replacing the portlet with a static hypertext markup language (html) fragment.

12. A computer program product comprising a computer readable storage medium containing computer code that, when executed by a computer, implements a method for estimating the frequencies of elements in an input stream, wherein the method comprises:
   receiving a request for a portal page, the portal page comprising a plurality of portlets;
   determining a current system load;
   determining, based on the current system load, whether a performance rule is triggered; and
   in the event a performance rule is triggered, deactivating at least one of the plurality of portlets.

13. The computer program product according to claim 12, further comprising receiving data regarding the portal page.

14. The computer program product according to claim 13, further comprising suggesting of a new performance rule based on the received data.

15. The computer program product according to claim 14, further comprising automatically replacing the performance rule with the suggested new performance rule.

16. The computer program product according to claim 13, wherein the received data comprises a system load generated by one of the plurality of portlets.

17. The computer program product according to claim 13, wherein the received data comprises a usage of a portlet by a user.

18. A system for portal performance optimization comprising:
   a portal server configured to receive a request for a portal page, the portal page comprising a plurality of portlets, the portal server comprising:
      a performance management component, the performance management component configured to determine a current system load; and
      a rules engine, the rules engine configured to determine if a performance rule is triggered by the determined current system load, and, in the even a performance rule is triggered, to apply the triggered performance rule to at least one of the plurality of portlets.

19. The system of claim 18, wherein the portal server further comprises a learning component, the learning component configured to receive data regarding the portal page.

20. The system of claim 19, wherein the learning component is further configured to suggest a new performance rule based on the received data.

* * * * *